USO06864681B1

United States Patent
Horner et al.

(10) Patent No.: US 6,864,681 B1
(45) Date of Patent: Mar. 8, 2005

(54) SENSOR ASSEMBLY

(75) Inventors: Stephen J. Horner, Fenton, MI (US); Kevin P. Jokipii, Center Line, MI (US); John A. Barrs, Farmington Hills, MI (US); David L. Becker, White Lake, MI (US); Jonathan R. Penvose, Davisburg, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/770,271

(22) Filed: Feb. 2, 2004

(51) Int. Cl.[7] .................................................. G01B 7/30
(52) U.S. Cl. ............................ 324/207.25; 324/207.21
(58) Field of Search ........................ 324/160, 173–174, 324/207.11, 207.13, 207.2, 207.21, 207.22, 207.25; 123/612, 617; 33/1 N, 1 PT, 708

(56) References Cited

U.S. PATENT DOCUMENTS 6,211,794 B1 * 4/2001 DeSoto .................... 340/686.1
6,298,565 B1    10/2001 Weber et al.
6,323,641 B1    11/2001 Allwine
6,373,242 B1     4/2002 Wappling
6,433,538 B1     8/2002 Reichl et al.
6,448,763 B1 *   9/2002 Spellman ............... 324/207.21
6,600,310 B2     7/2003 Nyce et al.
2003/0177649 A1 * 9/2003 Ito et al. .................... 33/1 PT

* cited by examiner

Primary Examiner—Bot LeDynh
(74) Attorney, Agent, or Firm—Tarolli, Sundheim, Covell & Tummino L.L.P.

(57) ABSTRACT

A code wheel (32) is rotatable with a vehicle steering wheel (12). A magnet (78) mounted on a rotatable driven component (34) indicates the number of revolutions of the code wheel (32). A sensing device (74) is provided to sense a flux field provided by the magnet (78). The magnetic flux field varies relative to the sensing device (74) as the driven component (34) is rotated by the code wheel (32).

14 Claims, 1 Drawing Sheet

SENSOR ASSEMBLY

BACKGROUND OF THE INVENTION

The present invention relates to a new and improved sensor assembly which may be utilized to provide an output indicative of the position of a vehicle steering wheel or other rotatable article.

A known sensor assembly includes a rotor on which a permanent magnet is disposed. The permanent magnet has a spiral or curved form. A stator is provided with two gaps. One of the gaps in the stator is a straight, radially extending gap. A magnetic-field-sensitive element is disposed in the straight, radially extending gap. The second gap in the stator has a curved configuration. A sensor assembly having this construction is disclosed in U.S. Pat. No. 6,433,538.

SUMMARY OF THE INVENTION

The present invention provides a new and improved sensor assembly. The sensor assembly includes a magnet disposed on a rotatable component of the sensor assembly. The magnet has an arcuate configuration with an inner end portion of the magnet disposed closer to an axis about which the rotatable component rotates than an outer end portion of the magnet.

The magnet on the rotatable component may advantageously form a spiral. The spiral may extend for one turn around the axis about which the rotatable component rotates.

A sensing device senses a magnetic flux field provided by the magnet. The sensing device may be disposed further from an axis about which the rotatable component rotates than the outer end portion of the magnet.

A code wheel may be provided in association with the rotatable component. The rotatable component may be driven through a portion of a revolution for each revolution of the code wheel.

Although the sensor assembly may be utilized in many different environments, in one specific instance, the code wheel was rotatable with a vehicle steering wheel. In this specific instance, the output from the sensing device was a function of rotation of the steering wheel.

The present invention has features which may be utilized together in the manner disclosed herein. Alternatively, the various features of the present invention may be used separately or in different combinations with each other. For example, it is contemplated that the rotatable component may be used with or without the code wheel. Although a sensor assembly constructed in accordance with the present invention is advantageously utilized in association with a vehicle steering wheel, it should be understood that the sensor assembly may be utilized in association with rotatable articles other than steering wheels.

BRIEF DESCRIPTION OF THE DRAWINGS

The foregoing and other features of the invention will become more apparent upon consideration of the following description taken in connection with the accompanying drawings wherein.

DESCRIPTION OF ONE SPECIFIC PREFERRED EMBODIMENT OF THE INVENTION

Figure 1:
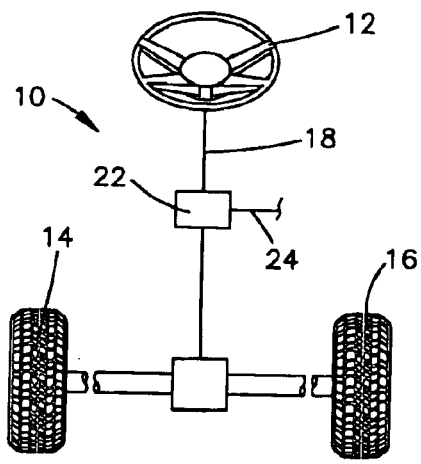
FIG. 1 is a schematic illustration depicting the relationship of a steering wheel to steerable vehicle wheels and to a steering angle sensor assembly.

An apparatus 10 for use in steering a vehicle is illustrated schematically in FIG. 1. The apparatus 10 includes a steering wheel 12 which is connected with steerable vehicle wheels 14 and 16 through a steering column 18. Rotation of the steering wheel 12 turns the vehicle wheels 14 and 16 to effect the turning of a vehicle in a known manner.

A steering angle sensor assembly 22 is connected with the steering wheel 12 and steerable vehicle wheels 14 and 16 through the steering column 18. The steering angle sensor assembly 22 has an output which varies as a function of rotation of the steering wheel 12. The output from the steering angle sensor assembly 22 varies with variations in the speed of rotation of the steering wheel 12, the angular position of the steering wheel, and the direction of rotation of the steering wheel.

The output from the steering angle sensor assembly 22 is conducted over a cable 24 to a vehicle stability control system. However, it is contemplated that the output from the steering angle sensor assembly 22 may be conducted to other control systems. For example, the output from the steering angle sensor assembly 22 may be conducted to a control system for a motor which provides power to turn the steerable vehicle wheels 14 and 16. The motor which provides power to turn the steerable vehicle wheels 14 and 16 may be an electric motor.

Figure 2:
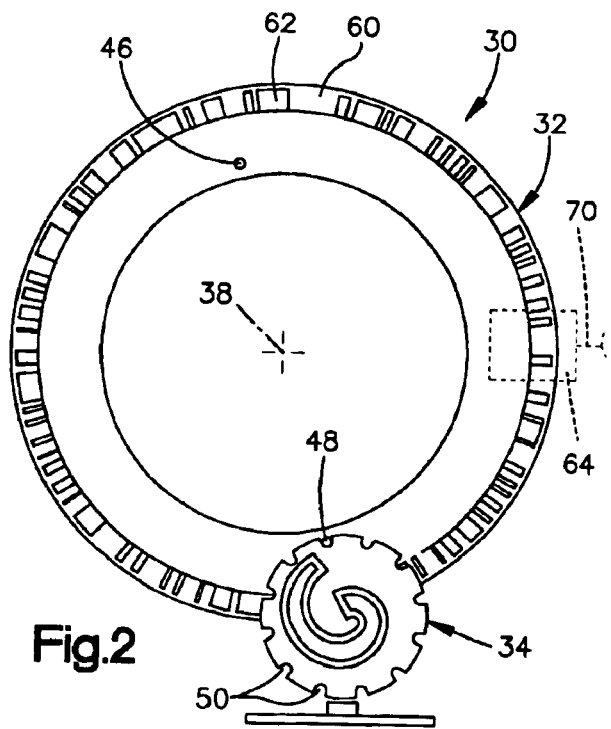
FIG. 2 is an enlarged schematic illustration depicting components of the steering angle sensor assembly of FIG. 1.

The steering angle sensor assembly 22 includes components 30 which are illustrated in FIG. 2. The components 30 include a code wheel 32 and a driven component or index wheel 34. The code wheel 32 is connected with the steering wheel 12 and steering column 18. The code wheel 32 rotates with the steering wheel 12. The code wheel 32 rotates about its central axis 38 which is coincident with a central axis of the steering column 18.

Figure 5:
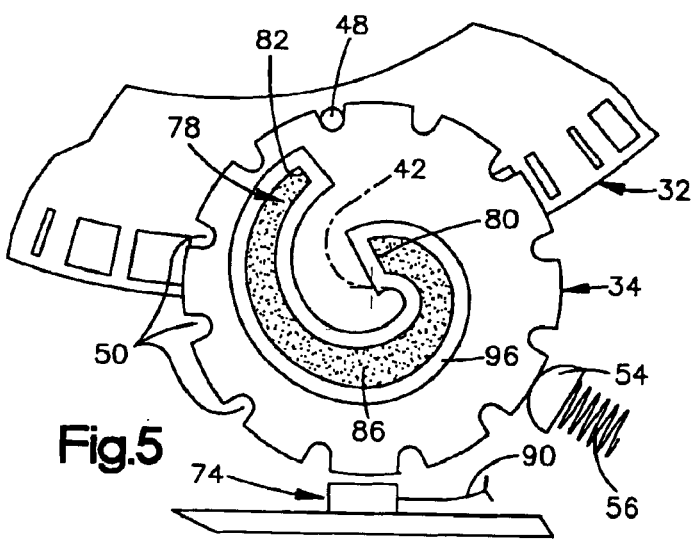
FIG. 5 is an enlarged fragmentary illustration of a portion of the components of the steering angle sensor assembly of FIG. 2.

The driven component or index wheel 34 is rotatable about its central axis 42 (FIG. 5). The central axis 42 of the index wheel 34 extends parallel to the central axis 38 (FIG. 2) of the code wheel 32.

Figure 3:
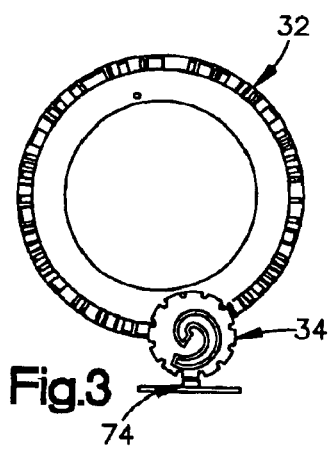
FIG. 3 is a schematic illustration, on a reduced scale, of the components of the steering angle sensor assembly of FIG. 2, the components of the steering angle sensor assembly being illustrated in FIG. 3 in a position corresponding to a hard turn in a first direction.
Figure 4:
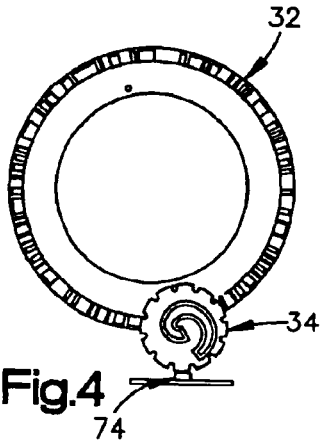
FIG. 4 is a schematic illustration, generally similar to FIG. 3, with a components of the steering angle sensor assembly in a position corresponding to a hard turn in a second direction opposite to the first direction.

When the steerable vehicle wheels 14 and 16 are in the straight ahead orientation of FIG. 1, the code wheel 32 and index wheel 34 are in the orientation illustrated in FIG. 2. When the steering wheel 12 is rotated through a plurality of revolutions to turn the steerable wheels 14 and 16 to effect a hard turn of a vehicle in one direction, for example to the left, the code wheel 32 and index wheel 34 move to the relationship illustrated in FIG. 3. When the steering wheel 12 is rotated through a plurality of revolutions to turn the steerable wheels 14 and 16 to effect a hard turn of the vehicle in the opposite direction, for example to the right, the code wheel 32 and index wheel 34 move to the relationship illustrated in FIG. 4.

The index wheel 34 is driven at a rate which is a predetermined function of the rate of rotation of the code wheel 32 and steering wheel 12. It is contemplated that the index wheel 34 may be driven at a rate which is any one of many different functions of the rate of rotation of the code wheel 32. In the embodiment of the invention illustrated in FIGS. 2–5, the index wheel 34 is rotated through sixty degrees each time the code wheel 32 is rotated through a complete revolution.

Although the index wheel 34 may be continuously driven during rotation of the code wheel 32, in the embodiment of the invention illustrated in FIGS. 2–5, the index wheel 34 is intermittently rotated in a stepwise manner. Each time the code wheel 32 and steering wheel 12 rotate through one half of a revolution, the index wheel 34 is rotated through thirty degrees. However, the index wheel 34 is only rotated through less than one hundred and eighty degrees from the initial or straight ahead orientation of FIGS. 2 and 5.

In the illustrated embodiment of the invention, the code wheel 32 is provided with a pair of drive pins 46 and 48 (FIG. 2). The drive pins 46 and 48 are fixedly connected to the code wheel 32. The drive pins 46 and 48 have central axes which extend parallel to the central axis 38 of the code wheel.

The index wheel 34 is provided with a plurality of index recesses 50 (FIG. 5). The index recesses 50 are disposed in an annular array about the periphery of the index wheel 50. The index recesses are configured to engage the drive pins 46 and 48.

The drive pins 46 and 48 sequentially move into and out of engagement with the index recesses 50 in the index wheel 34 during rotation of the code wheel 32. The index pins 46 and 48 sequentially rotate the index wheel 34 through a portion of a revolution, that is, thirty degrees, as one of the drive pins 46 or 48 moves into and out of engagement with an index recess 50.

When a drive pin 46 or 48 moves out of engagement with one of the index recesses 50 in the index wheel 34, a detent member 54 (FIG. 5) is moved partway into one of the index recesses 50 by a biasing spring 56. The detent member 54 engages the outer end portion of an index recess 50. Therefore, the detent member 54 can be cammed out of the index recess 50 when a drive pin 46 or 48 again engages the index wheel and rotates the index wheel.

It should be understood that the index wheel 50 may be held against rotation, in the absence of engagement of one of the drive pins 46 or 48 with an index recess 50, in a different manner if desired. For example, a friction clutch may be provided in association with the index wheel 34. Alternatively, a detent may engage recesses in a shaft connected with the index wheel 34.

In the embodiment of the invention illustrated in FIGS. 2 and 5, the drive pins 46 and 48 engage the recesses 50 to intermittently rotate the index wheel 35. However, a different type of intermittent drive mechanism may be used if desired. For example, a Geneva drive mechanism may be used. Alternatively, a continuous drive mechanism, such as a gear drive, may be used if desired.

The code wheel 32 is provided with an annular code ring 60 (FIG. 2) having indicia or code markings 62. The code markings 62 are read by a scanner 64. The scanner 64 has an output which is conducted over a lead 70 in the cable 24 to a control system. The output conducted from the scanner 64 varies as a function of variations in the code markings 62 read by the scanner.

The code markings 62 read by the scanner 64 provide an indication of the location of the code wheel 32 in a single revolution of the code wheel. However, the code markings 62 read by the scanner 64 do not provide an indication of the number of revolutions which the code wheel 32 has made. This is because each time the code ring 60 is rotated through a complete revolution, the scanner 64 reads the same code markings 62 in the code ring 60.

In order to keep track of the number of revolutions which have been made by the code wheel, a sensor assembly 74 (FIG. 5) is provided in association with the index wheel 34. The output from the scanner 64 indicates where the steering wheel 12 is located in a revolution of the steering wheel. The output from the sensor assembly 74 indicates the number of revolutions through which the steering wheel 12 has been rotated.

A magnet 78 is fixedly connected to the index wheel 34. The magnet 78 has an arcuately curving configuration. In the embodiment of the invention illustrated in FIG. 5, the magnet 78 has the configuration of a spiral which progresses outward away from this axis 42 of rotation of the index wheel 34. The spiral shaped magnet 78 extends for one complete turn around the axis 42 about which the index wheel 34 rotates.

The spiral shaped magnet 78 has an inner end portion 80 (FIG. S) which is disposed relatively close to the axis 42 of rotation of the index wheel 34. In addition, the magnet 78 has an outer end portion 82 which is disposed relatively close to the periphery of the index wheel 34. The outer end portion 82 of the magnet 78 is spaced further from the axis 42 than is the inner end portion 80 of the magnet. The outer end of the magnet 78 is radially aligned with the inner end of the magnet.

The distance between the magnet 78 and in the periphery of the circular index wheel 34 gradually decreases as the magnet winds radially outward from the inner end portion 80 of the magnet to the outer end portion 82 of the magnet. The sensor assembly 74 is disposed radially outward from the outer end portion 82 of the magnet 78. During rotation of magnet 78 and index wheel 34 about the axis 42, the radially outer end portion 82 of the magnet moves along a circular path which is closer to the sensor assembly 74 than a circular path along which the inner end portion 80 of the magnet moves. Throughout rotation of the index wheel 34 about the axis 42, a portion of the magnet 78 is disposed radially inward from the sensor assembly 74.

When the index wheel 34 is in the centered or initial position corresponding to the steerable wheels 14 and 16 being in a straight ahead orientation (FIGS. 2 and 5), the sensor assembly 74 is close to a central portion 86 (FIG. 5) of the magnet 78. Therefore, if the index wheel 34 is rotated in a clockwise direction (as viewed in FIG. 5) from the centered or initial position, the distance between the magnet 78 and the sensor assembly 74 increases. Similarly, if the index wheel 24 is rotated in a counterclockwise direction from the central or initial position of FIG. 5, the distance between the magnet 78 and the sensor assembly 74 decreases.

Although the sensor assembly 74 has been illustrated as being disposed radially outward from the periphery of the index wheel 34, it is contemplated that the sensor assembly may be disposed at a location radially inward from the peripheral edge portion of the index wheel 34. For example, the sensor assembly may be disposed radially inward of the annular array of index recesses 50 and disposed axially outward of the index wheel 34.

The sensor assembly 74 is magnetic flux field sensitive. As the index wheel 34 rotates, the distance between the sensor assembly 74 and the magnet 78 changes. The strength of the magnetic flux field to which the sensor assembly 70 is exposed changes as the distance between the sensor assembly and the magnet 78 changes. An output signal transmitted from the sensor assembly 74 over a lead 90 (FIG. 5) in the cable 24 (FIG. 1) to a control system changes with changes in the magnetic flux field to which the sensor-assembly 74 is exposed. The output signal from the sensor assembly 74 varies as a function of variations in strength of a magnetic flux field provided by the magnet 78 at the sensor assembly 74.

The sensor assembly 74 (FIG. 5) is a ratio metric Hall effect device. However, the sensor assembly 74 may be formed by other known devices which are magnetic field sensitive. For example, the sensor assembly 74 may be a giant magneto resistive device, a Wiegand device, or other similar device.

When the steerable vehicle wheels are in a straight ahead orientation, the code wheel 32 and index wheel 34 are in the positions illustrated in FIGS. 2 and 5. At this time, the sensor assembly 74 is disposed adjacent to the central portion 86 of the spiral shaped magnet 78. The output from the sensor assembly 74 is indicative of this orientation of the magnet 78 and index wheel 34.

When the steering wheel 12 and code wheel 38 are rotated through less than one half of a revolution in a clockwise direction, the drive pin 48 (FIG. 5) is effective to rotate the index wheel 34 in a counterclockwise direction relative to the sensor assembly 74. As this occurs, the drive pin 48 moves out of engagement with an index recess 50 in the index wheel 34. At the same time, the detent member 54 moves into engagement with an index recess 50 and rotation of the index wheel 34 is interrupted.

As the index wheel 34 rotates in a counterclockwise direction from the position shown in FIG. 5, the distance between the magnet 78 and sensor assembly 74 decreases. This increases the strength of the magnetic flux field to which the sensor assembly 74 is exposed. Therefore, the output from the sensor assembly 74 changes.

The output from the scanner 64 also changes as the steering wheel 12 and code wheel 32 rotate in a clockwise direction. The output from the scanner 62 is indicative of the extent of rotation of the steering wheel 12 within one revolution from its straight ahead orientation for the steerable wheels 14 and 16.

As the steering wheel 12 and the code wheel 32 continue to rotate in a clockwise direction (as viewed in FIG. 2), the drive pin 46 moves into engagement with one of the index recesses 50 in the index wheel 34. Continued rotation of the steering wheel 12 and code wheel 32 causes the drive pin 46 to resume rotation of the index wheel 34 in a counterclockwise direction. As this occurs, the magnetic flux field sensed by the sensor assembly 74 again changes as the outer end portion 82 of the magnet 78 moves toward the sensor assembly 74. As the drive pin 46 moves out of engagement with one of the index recesses 50, the detent member 54 enters an index recess to hold the index wheel 34 against rotation.

Continued clockwise rotation of the steering wheel 12 and code wheel 32 causes the drive pin 48 to again rotate the index wheel 34 in a counterclockwise direction relative to the sensor assembly. This results in the distance between the sensor assembly 74 and the magnet 78 decreasing as the outer end portion 82 of the spiral shaped magnet 78 approaches the sensor assembly. Decreasing the distance between the sensor assembly 74 and the magnet 78 increases the strength of the magnetic field to which the sensor assembly is exposed. This results in a change in the output from the sensor assembly 74. As the drive pin 48 moves out of engagement with an index recess 50 in the index wheel 34, a detent member 54 moves into engagement with an index recess to again hold the index wheel against rotation.

The changing output from the sensor assembly 74 with rotation of the index wheel 34 enables a control system connected with the steering angle sensor assembly 22 (FIG. 1) to determine the extent to which the steering wheel 12 and code wheel 32 have been rotated about the central axis 38 of the steering column 18. Therefore, the control system can determine the angle through which the steerable vehicle wheels 14 and 16 have been turned.

If the steering wheel 12 is rotated in a counterclockwise direction, the code wheel 32 is also rotated in a counterclockwise direction. This results in the drive pins 46 and 48 rotating the index wheel 34 in a clockwise direction. Clockwise rotation of the index wheel 34 moves the inner end portion 80 of the magnet 78 toward the sensor assembly 74 (FIG. 5). Therefore, the distance between the magnet and the sensor assembly increases as the steering wheel 12 is rotated in a counterclockwise direction.

In addition to providing outputs indicative of the position of the steerable vehicle wheels 14 and 16, the scanner 64 and sensor assembly 74 have outputs which indicate the speed of rotation of the steering wheel 12. Thus, the faster the steering wheel 12 is rotated, the faster the code ring 60 is moved relative to the scanner 64 and the shorter the time between indexing steps of the index wheel 34 and magnet 78 about the central axis 42 of the index wheel. This enables the control system connected with the scanner 64 and sensor assembly 74 to determine the rate of rotation of the steering wheel 12.

The magnet 78 may have any one many different known constructions. Thus, the magnet 78 may be formed as a single piece of metal having the spiral configuration illustrated in FIG. 5. Alternatively, the magnet may be of the plastic-filled sheet type. If desired, the magnet 78 may be formed of pressed powder.

The magnet 78 may be secured to the index wheel 34 in any one of many different ways. In the specific example illustrated in FIG. 5, a spiral frame 96 is fixedly connected to the index wheel 34. The magnet 78 is held in place in the spiral frame by suitable fasteners, such as adhesive or mechanical fasteners.

From the above description of the invention, those skilled in the art will perceive improvements, changes and modifications. Such improvements, changes and modifications within the skill of the art are intended to be covered by the appended claims.

Having described the invention, the following is claimed:

1. A sensor assembly comprising:

a code wheel rotatable with a vehicle steering wheel;

a mechanism for indicating the number of rotations of said code wheel, said mechanism including, a rotatable driven component rotatable by said code wheel;

said driven component being driven a predetermined portion of 360° for one revolution of said code wheel;

a magnet mounted on said driven component for rotation with said driven component and providing a magnetic flux field; and a sensing device for sensing said magnetic flux field, said magnetic flux field varies relative to said sensing device as said driven component is rotated by said code wheel, said sensing device being operable to provide an output signal which varies with variations in said magnetic flux field.

2. A sensor assembly as set forth in claim 1 further including a first index element connected with said code wheel and a second index element connected with said driven component, said first index element being effective to transmit force from said code wheel to said driven component to rotate said driven component.

3. A sensor assembly as set forth in claim 2 wherein said code wheel and driven component are rotatable about parallel axes.

4. A sensor assembly comprising:
a code wheel rotatable with a vehicle steering wheel;
a mechanism for indicating the number of rotations of said code wheel, said mechanism including,
a rotatable driven component rotatable by said code wheel;
said driven component being driven a predetermined portion of 360° for one revolution of said code wheel;
a magnet mounted on said driven component for rotation with said driven component and providing a magnetic flux field; and
a sensing device for sensing said magnetic flux field, said magnetic flux field varies relative to said sensing device as said driven component is rotated by said code wheel, said sensing device being operable to provide an output signal which varies with variations in said magnetic flux field, said magnet is shaped and positioned such that the distance of the magnet from said magnetic sensing device changes through 360° of revolution of the magnet and said magnetic sensing device senses a constantly changing magnetic field as said magnet rotates.

5. A sensor assembly as set forth in claim 4 wherein said magnet is shaped and positioned to form a spiral which extends through a turn around an axis of rotation of said driven component.

6. A sensor assembly as set forth in claim 4 wherein said magnet is shaped to form a spiral having a radially outer end portion and a radially inner end portion, said magnet being positioned with said radially inner end portion of said spiral being disposed closer to an axis of rotation of said driven component than said radially outer end portion of said spiral, said sensing device being disposed further from the axis of rotation of said driven component than said radially outer end portion of said spiral.

7. A sensor assembly as set forth in claim 4 further including a first index element connected with said code wheel and a second index element connected with said driven component, said first index element being effective to transmit force from said code wheel to said driven component to rotate said driven component.

8. A sensor assembly as set forth in claim 4 wherein said code wheel and driven component are rotatable about parallel axes.

9. A sensor assembly comprising:
a code wheel rotatable with a vehicle steering wheel;
a mechanism for indicating the number of rotations of said code wheel, said mechanism including,
a rotatable driven component rotatable by said code wheel;
said driven component being driven a predetermined portion of 360° for one revolution of said code wheel;
a magnet mounted on said driven component for rotation with said driven component and providing a magnetic flux field, said magnet forms a spiral which extends through a turn around an axis of rotation of said driven component; and
a sensing device for sensing said magnetic flux field, said magnetic flux field varies relative to said sensing device as said driven component is rotated by said code wheel, said sensing device being operable to provide an output signal which varies with variations in said magnetic flux field.

10. A sensor assembly as set forth in claim 9 further including a first index element connected with said code wheel and a second index element connected with said driven component, said first index element being effective to transmit force from said code wheel to said driven component to rotate said driven component.

11. A sensor assembly as set forth in claim 10 wherein said code wheel and driven component are rotatable about parallel axes.

12. A sensor assembly comprising:
a code wheel rotatable with a vehicle steering wheel;
a mechanism for indicating the number of rotations of said code wheel, said mechanism including,
a rotatable driven component rotatable by said code wheel;
said driven component being driven a predetermined portion of 360° for one revolution of said code wheel;
a magnet mounted on said driven component for rotation with said driven component and providing a magnetic flux field, said magnet forms a spiral having a radially outer end portion and a radially inner end portion, said radially inner end portion of said spiral being disposed closer to an axis of rotation of said driven component than said radially outer end portion of said spiral, and
a sensing device for sensing said magnetic flux field, said magnetic flux field varies relative to said sensing device as said driven component is rotated by said code wheel, said sensing device being operable to provide an output signal which varies with variations in said magnetic flux field, said sensing device being disposed further from the axis of rotation of said driven component than said radially outer end portion of said spiral.

13. A sensor assembly comprising:
a rotatable component;
a magnet disposed on and rotatable with said rotatable component, said magnet forms a spiral which extends for a turn about the axis about which said rotatable component rotates, said magnet having an arcuate configuration with an inner end portion of said magnet disposed closer to an axis about which said rotatable component rotates than an outer end portion of said magnet; and
a sensing device which senses a magnetic flux field provided by said magnet, said sensing device being disposed further from the axis about which said rotatable component rotates than said outer end portion of said magnet.

14. A sensor assembly as set forth in claim 13 further including a rotatable member having a drive element which cooperates with a drive element connected with said rotatable component to rotate said rotatable relative to said sensing device.

* * * * *